United States Patent
Mizuhashi et al.

(10) Patent No.: US 12,141,569 B2
(45) Date of Patent: Nov. 12, 2024

(54) REDUNDANT SYSTEM AND LOAD DRIVE CONTROL DEVICE

(71) Applicant: Hitachi Astemo, Ltd., Hitachinaka (JP)

(72) Inventors: Yoshiaki Mizuhashi, Hitachinaka (JP); Mitsuhiko Watanabe, Hitachinaka (JP); Yoshitaka Abe, Hitachinaka (JP); Mamoru Ogura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/769,417

(22) PCT Filed: Oct. 9, 2020

(86) PCT No.: PCT/JP2020/038236
§ 371 (c)(1),
(2) Date: Apr. 15, 2022

(87) PCT Pub. No.: WO2021/075361
PCT Pub. Date: Apr. 22, 2021

(65) Prior Publication Data
US 2024/0126528 A1    Apr. 18, 2024

(30) Foreign Application Priority Data
Oct. 18, 2019   (JP) .................. 2019-191241

(51) Int. Cl.
*G06F 8/65* (2018.01)
(52) U.S. Cl.
CPC ...................... *G06F 8/65* (2013.01)
(58) Field of Classification Search
USPC ........................................................ 717/168
See application file for complete search history.

(56) References Cited

U.S. PATENT DOCUMENTS

| | | | |
|---|---|---|---|
| 2015/0014098 A1* | 1/2015 | Stolzl | B66B 1/32 |
| | | | 187/394 |
| 2017/0158183 A1* | 6/2017 | Hecker | B60T 13/261 |

(Continued)

FOREIGN PATENT DOCUMENTS

| | | |
|---|---|---|
| JP | 2010-167997 A | 8/2010 |
| JP | 2012-091754 A | 5/2012 |

(Continued)

OTHER PUBLICATIONS

"Hyundai Mobis Develops a Dual-Mode Electronic Steering System Optimized for Autonomous Driving"; Businesswire.com website [full url in ref.]; Jul. 26, 2018 (Year: 2018).*

(Continued)

*Primary Examiner* — Qing Chen
*Assistant Examiner* — Clint Thatcher
(74) *Attorney, Agent, or Firm* — Foley & Lardner LLP

(57) ABSTRACT

Provided is a redundant system capable of executing a start request received during update of a microcomputer control program even when an external nonvolatile memory is employed in a redundant system in which one load is controlled by a plurality of control circuits having a redundant configuration, the redundant system being low in cost and excellent in responsiveness. In the redundant system that controls one load by a plurality of control systems having a redundant configuration, when an update program signal for the plurality of control systems is received, update of a control program for each of the plurality of control systems in a predetermined order is individually executed, and when a start request of the load is received during the execution of the update of a control program of one predetermined system, the load is controlled by a system other than the one predetermined system, and during the control, (Continued)

the update of the control program of the one predetermined system is continued.

17 Claims, 17 Drawing Sheets

(56) References Cited

U.S. PATENT DOCUMENTS

| | | | | |
|---|---|---|---|---|
| 2018/0015891 A1* | 1/2018 | Taniguchi | ............. | H02J 7/1423 |
| 2018/0285027 A1* | 10/2018 | Okajima | ............ | H04N 1/00973 |
| 2019/0138296 A1 | 5/2019 | Ishikawa et al. | | |
| 2020/0070661 A1* | 3/2020 | Akuzawa | ................ | B60L 15/38 |
| 2021/0011711 A1* | 1/2021 | Ogawa | ..................... | G06F 8/62 |

FOREIGN PATENT DOCUMENTS

| | | |
|---|---|---|
| JP | 2017-204227 A | 11/2017 |
| JP | 2019-084941 A | 6/2019 |

OTHER PUBLICATIONS

International Search Report with English Translation in related Application No. PCT/JP2020/038236, dated Jan. 19, 2021 (2 pages).

* cited by examiner

EXTERNAL NONVOLATILE MEMORY 121

FIG. 16

| | FLAG INFORMATION OF FIRST SYSTEM | FLAG INFORMATION OF SECOND SYSTEM | LOAD DRIVE | STATE |
|---|---|---|---|---|
| 1 | 0 | 0 | ALLOWED | NO PROGRAM UPDATE OF FIRST SYSTEM/SECOND SYSTEM |
| 2 | 0 | 1 | ALLOWED | PROGRAM UPDATE OF ONLY SECOND SYSTEM |
| 3 | 1 | 0 | ALLOWED | PROGRAM UPDATE OF ONLY FIRST SYSTEM |
| 4 | 1 | 1 | FORBIDDEN | PROGRAM UPDATE OF FIRST SYSTEM/SECOND SYSTEM |

MUTUAL MONITORING THROUGH INTER-MICROCOMPUTER COMMUNICATION NOT TO BE STATE OF NUMBER 4

FIG. 19

| No. | FLAG INFORMATION OF FIRST SYSTEM | FLAG INFORMATION OF SECOND SYSTEM | IGN_SW | INDICATOR STATE |
|---|---|---|---|---|
| 1 | 0 | 0 | OFF | NON-DISPLAY |
| 2 | 0 | 1 | OFF | NON-DISPLAY |
| 3 | 1 | 0 | OFF | NON-DISPLAY |
| 4 | 1 | 1 | OFF | NON-DISPLAY |
| 5 | 0 | 0 | ON | NON-DISPLAY |
| 6 | 0 | 1 | ON | DISPLAY |
| 7 | 1 | 0 | ON | DISPLAY |
| 8 | 1 | 1 | ON | DISPLAY |

FIG. 21

| No. | FLAG INFORMATION OF FIRST SYSTEM | FLAG INFORMATION OF SECOND SYSTEM | IGN_SW | STATE OF COMMUNICATION UNIT |
|---|---|---|---|---|
| 1 | 0 | 0 | OFF | NO COMMUNICATION TO EXTERNAL ECU |
| 2 | 0 | 1 | OFF | NO COMMUNICATION TO EXTERNAL ECU |
| 3 | 1 | 0 | OFF | NO COMMUNICATION TO EXTERNAL ECU |
| 4 | 1 | 1 | OFF | NO COMMUNICATION TO EXTERNAL ECU |
| 5 | 0 | 0 | ON | NO COMMUNICATION TO EXTERNAL ECU |
| 6 | 0 | 1 | ON | COMMUNICATION TO EXTERNAL ECU |
| 7 | 1 | 0 | ON | COMMUNICATION TO EXTERNAL ECU |
| 8 | 1 | 1 | ON | COMMUNICATION TO EXTERNAL ECU |

REDUNDANT SYSTEM AND LOAD DRIVE CONTROL DEVICE

TECHNICAL FIELD

The present invention relates to a load drive control device that controls driving of a load by a control circuit having a redundant configuration, and a program update method thereof.

BACKGROUND ART

Along with development of computer technology, computerization of vehicles has progressed, and drive control of a load such as a motor is performed by a central processing unit (CPU; hereinafter, also referred to as a microcomputer). Further, in recent years, in which functionally safe reliability is required, a load drive control device having a redundant configuration in which the same load is controlled by a plurality of control circuits has been used.

A control program used in such a load drive control device may be rewritten after product shipment in accordance with, for example, upgrade of the program for improving the function of the load drive control device, bug fix, or the like. This technique is generally called Over-The-Air (OTA).

When the OTA technology is introduced into a vehicle, it is necessary to adopt a microcomputer corresponding to an OTA function. An OTA-compatible microcomputer has a nonvolatile memory region in which an update program for update is stored in addition to a memory region in which a control program of a current version is stored. An update program transferred from the outside is temporarily stored in the update program memory region, and the update program is normally written when power is activated to upgrade the program.

In this case, since the nonvolatile memory inside the microcomputer needs to store two types of programs for the current version and the update version, a capacity that is twice or more the control program size is required. Therefore, for the purpose of reducing the cost, the capacity of the internal nonvolatile memory in the microcomputer may be reduced, and the external nonvolatile memory may be used.

As a background art in this technical field, for example, there is a technique as described in PTL 1. PTL 1 discloses "a vehicle program rewriting system in which when rewriting of a first program in a first electronic control device (first ECU) is completed, a rewriting device requests a restart to the first ECU and determines whether the rewriting is successful, and when the rewriting is determined as successful, rewriting of a second program in a second electronic control device (second ECU) is performed".

CITATION LIST

Patent Literature

PTL 1: JP 2012-91754 A

SUMMARY OF INVENTION

Technical Problem

During update of the microcomputer control program by the OTA, drive control of a load by the microcomputer cannot be performed. Therefore, the update is normally performed when the operation of the vehicle in which an ignition (IGN) is in an OFF state is stopped so as not to affect the operation of the vehicle.

When the nonvolatile memory inside the microcomputer has the memory region for the current version/the update version, two types of programs of the current version/the update version are built in, and the version is only upgraded by switching the program to be executed, so that the program version can be instantaneously switched, and there is substantially no influence of the update time of the program.

However, when an external nonvolatile memory is employed for cost reduction, the update program is stored in the external memory, and thus it takes time to write (download) the update program from the external memory to the internal memory. Therefore, as in the case of the internal nonvolatile memory, the program version cannot be instantaneously switched, and a predetermined time is required from the start of the update to the completion of the update of the program. For this reason, there is a problem that the vehicle cannot be operated until the program update is completed when the update of the program is started after the IGN is turned off and the IGN is turned on again before the update is completed.

In a system having a redundant configuration in which one load is controlled by two or more control circuits, it is necessary to operate the programs of the plurality of microcomputers by software of a set version. Therefore, once the update of the program is started, the system cannot be started until all the program updates of the plurality of microcomputers having the redundant configuration are completed. Thus, there is a concern that it takes more time until the vehicle becomes operable.

In PTL 1, the programs of the plurality of ECUs are rewritten in order when the ignition switch is turned on, but the problem in the redundant system as described above and the solution thereof are not described.

Therefore, an object of the present invention is to provide a redundant system capable of executing a start request received during update of a microcomputer control program even when an external nonvolatile memory is employed in a redundant system in which one load is controlled by a plurality of control circuits having a redundant configuration, the redundant system being low in cost and excellent in responsiveness.

Solution to Problem

In order to solve the above problems, the present invention provides a redundant system that controls one load by a plurality of control systems having a redundant configuration, wherein when an update program signal for the plurality of control systems is received, update of a control program for each of the plurality of control systems in a predetermined order is individually executed, and when a start request of the load is received during the execution of the update of a control program of one predetermined system, the load is controlled by a system other than the one predetermined system, and during the control, the update of the control program of the one predetermined system is continued.

Further, the present invention provides a redundant system that controls one load by a plurality of control systems having a redundant configuration, wherein when an update program signal for the plurality of control systems is received, update of a control program for each of the plurality of control systems in a predetermined order is individually executed, and when a start request of the load is received during the execution of the update of the control program of one predetermined system, the load is controlled by a system other than the one predetermined system, and during the control, rollback of the control program of the one predetermined system is executed.

Further, according to the present invention, in the load drive control device including the redundant system according to any one of the above, the load is a motor load.

Advantageous Effects of Invention

According to the present invention, it is possible to realize a redundant system capable of executing a start request received during update of a microcomputer control program even when an external nonvolatile memory is employed in a redundant system in which one load is controlled by a plurality of control circuits having a redundant configuration, the redundant system being low in cost and excellent in responsiveness.

As a result, it is possible to provide a load drive control device with a small inoperable period at low cost.

Objects, configurations, and effects besides the above description will be apparent through the explanation on the following embodiments.

BRIEF DESCRIPTION OF DRAWINGS

FIG. 16 is a truth table illustrating an operation of the load drive control device according to the second embodiment.

FIG. 19 is a truth table illustrating an operation of the load drive control device according to the third embodiment.

FIG. 21 is a truth table illustrating an operation of the load drive control device according to the fourth embodiment.

DESCRIPTION OF EMBODIMENTS

Figure 1:
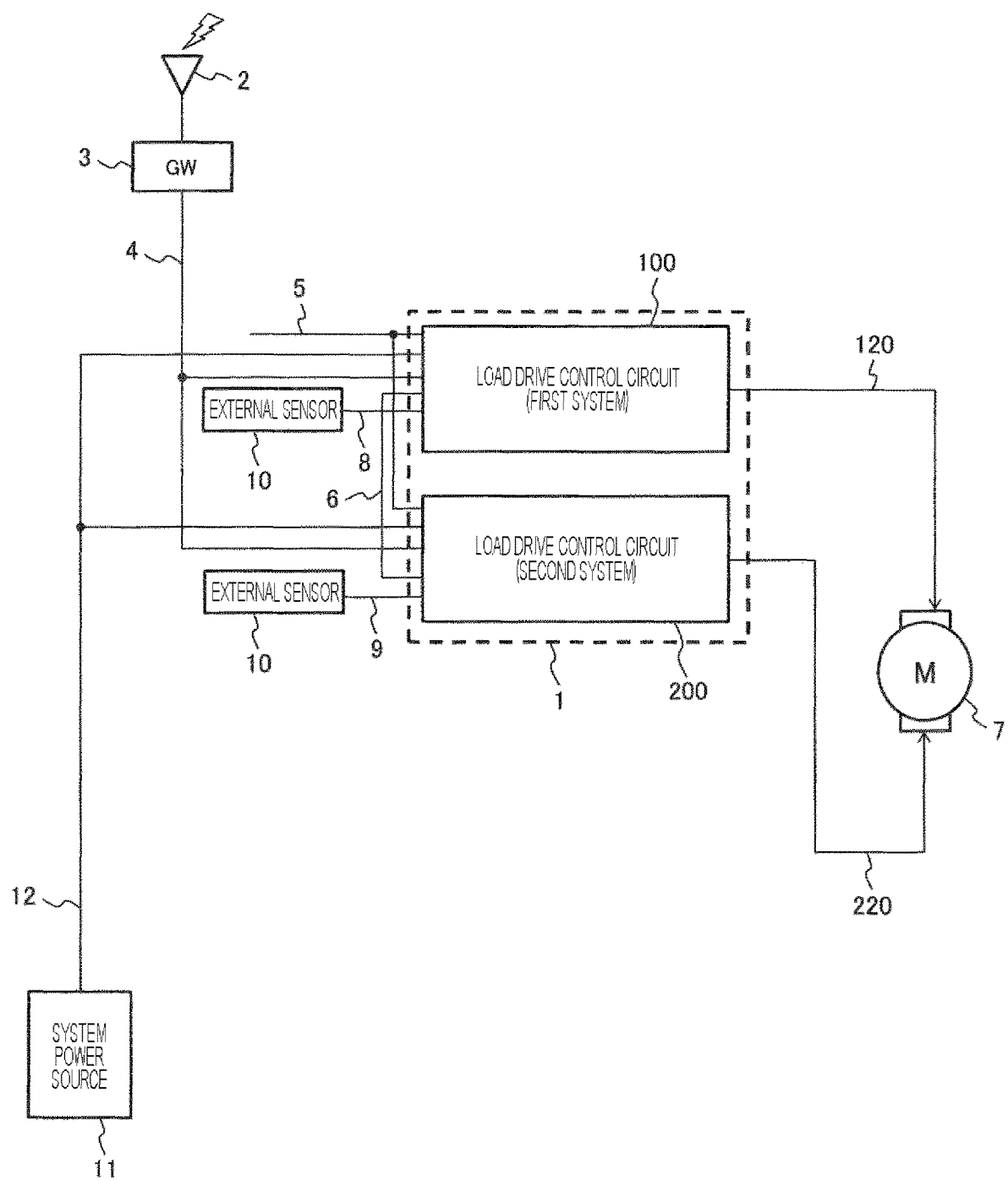
FIG. 1 is a diagram illustrating a schematic configuration of a load drive control device according to a first embodiment.

Hereinafter, embodiments of the invention will be described using the drawings. In the drawings, the same configurations are denoted by the same reference numerals, and detailed description of overlapping portions will be omitted.

In each of the following embodiments, an electric motor will be described as an example of the load, but the load is not limited thereto, and the same applies to a case where a load other than the electric motor is driven.

In addition, although a load drive control circuit having a two-redundant configuration in which one load is driven by a control circuit of two systems will be mainly described, a similar operational effect can be obtained even in a case of a plurality of redundant configurations of three or more redundant configurations as described later.

First Embodiment

A redundant system according to a first embodiment of the present invention and a load drive control device using the redundant system will be described with reference to FIGS. 1 to 10.

FIG. 1 is a diagram illustrating a schematic configuration of a load drive control device according to the present embodiment. In FIG. 1, reference numeral 1 denotes a load drive control device, and reference numeral 2 denotes an antenna, and receives an update program input from the outside by a wireless signal. Reference numeral 3 denotes a gateway unit that checks an update program, and reference numeral 4 denotes an update program signal. The update program signal 4 is input to a load drive control circuit (first system) 100 and a load drive control circuit (second system) 200 which are redundant control circuits of the load drive control device 1.

Reference numeral 5 denotes an IGN_SW signal for activating the system by turning on the ignition, reference numeral 6 denotes a microcomputer mutual communication signal for performing communication between microcomputers in the load drive control circuits 100 and 200 having a redundant configuration, reference numeral 11 denotes a system power source, reference numeral 12 denotes a power source signal, and reference numeral 10 denotes an external sensor.

The external sensor 10 outputs sensor signals 8 and 9. These signals are also input to the load drive control circuit (first system) 100 and the load drive control circuit (second system) 200, and each load drive control circuit performs calculation by a current version program programmed in a microcomputer, outputs load drive signals 120 and 220, and performs drive control of a motor load 7.

Figure 2:
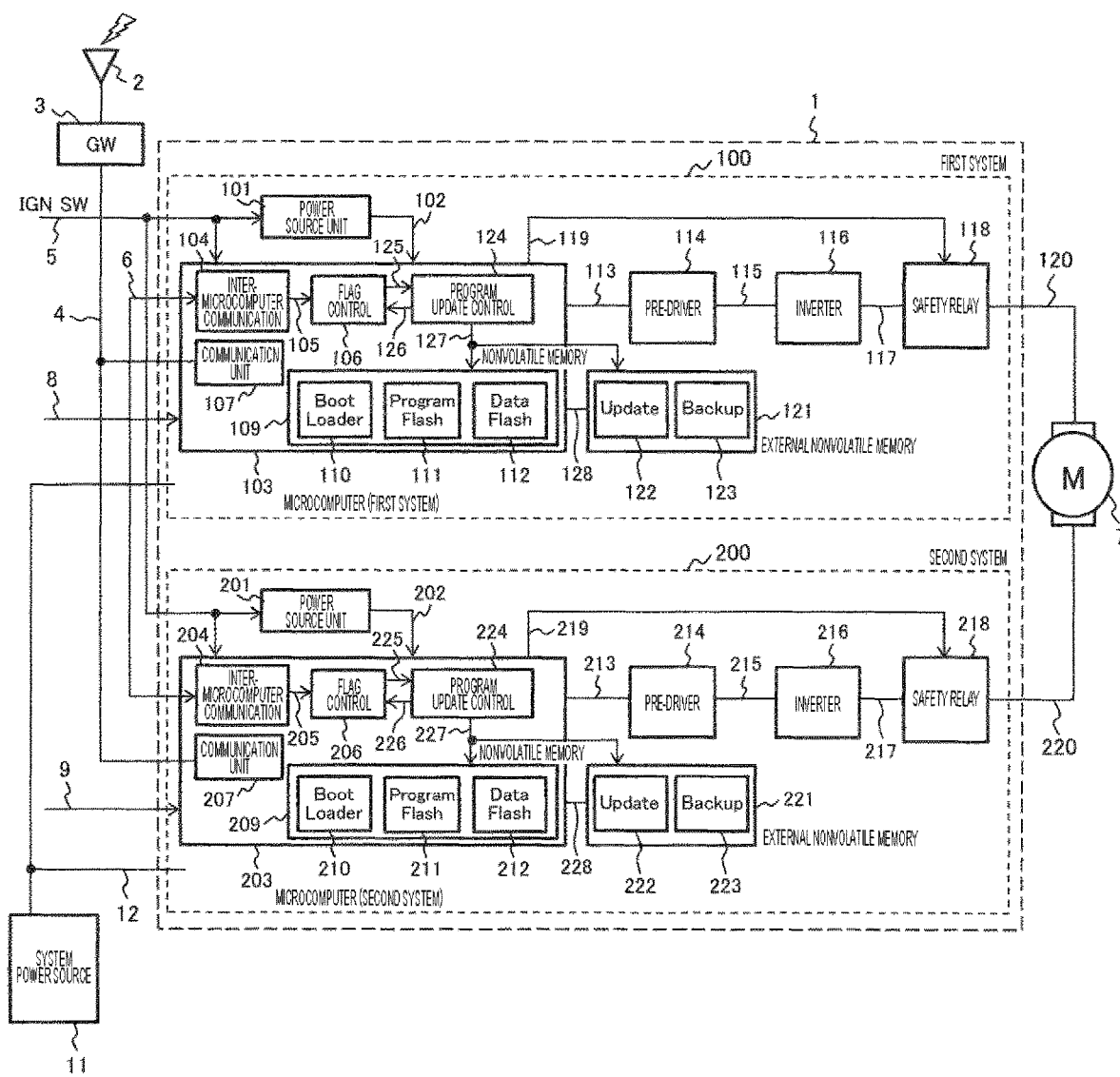
FIG. 2 is a block diagram illustrating a configuration of the load drive control device according to the first embodiment.

FIG. 2 is a block diagram illustrating a configuration of a load drive control device according to the present embodiment. In FIG. 2, reference numeral 1 denotes a load drive control device, and reference numerals 100 and 200 denote a load drive control circuit (first system) and a load drive control circuit (second system), respectively, and have redundant circuit configurations for driving and controlling the motor load 7. Each circuit configuration will be described below. (the following ( ) indicates a corresponding circuit unit of the redundant circuit.)

Reference numeral 101 (201) denotes a power source unit that supplies power to a microcomputer or other circuits, 102 (202) denotes a power source signal, 103 denotes a microcomputer (first system), and inter-microcomputer communication is executed by the microcomputer mutual communication signal 6 via an inter-microcomputer communication unit 104 (204) that performs the inter-microcomputer communication with another microcomputer (second system) (203) having a redundant circuit configuration.

Reference numeral 105 (205) denotes an inter-microcomputer communication signal, and is input to a flag control unit 106 (206) to perform flag control. The flag signal 125 (225) is input to a program update control unit 124 (224), program update control is performed, and a flag control signal 126 (226) for setting and clearing a flag according to a predetermined timing is output. The control program update state of each of the first system and the second system is managed as a flag.

In addition, the program update control unit 124 (224) outputs a memory control signal 127 (227) to control an internal nonvolatile memory 109 (209) and an external nonvolatile memory 121 (221).

The internal nonvolatile memory 109 (209) includes a boot loader region 110 (210), a program flash region 111 (211), and a data flash region 112 (212), and the current version program is stored and executed in the program flash region 111 (211).

The external nonvolatile memory 121 (221) includes an update region 122 (222) and a backup region 123 (223), and the update program signal (update program) 4 input from the gateway unit 3 is stored in the Update region 122 (222).

Reference numeral 113 (213) denotes a load drive signal for driving the motor load 7, reference numeral 114 (214) denotes a pre-driver, reference numeral 115 (215) denotes a pre-driver output signal, and reference numeral 116 (216) denotes an inverter circuit unit. The inverter circuit unit 116 (216) outputs an inverter signal 117 (217). The inverter signal 117 (217) is output to the motor load 7 as the load drive signal 120 (220) via a safety relay 118 (218) controlled by a safety relay control signal 119 (219) supplied from the microcomputer 103 (203), and the motor load 7 is driven and controlled.

Next, the operation of the load drive control device of the present embodiment will be described with reference to FIGS. 3 to 7.

Figure 3:
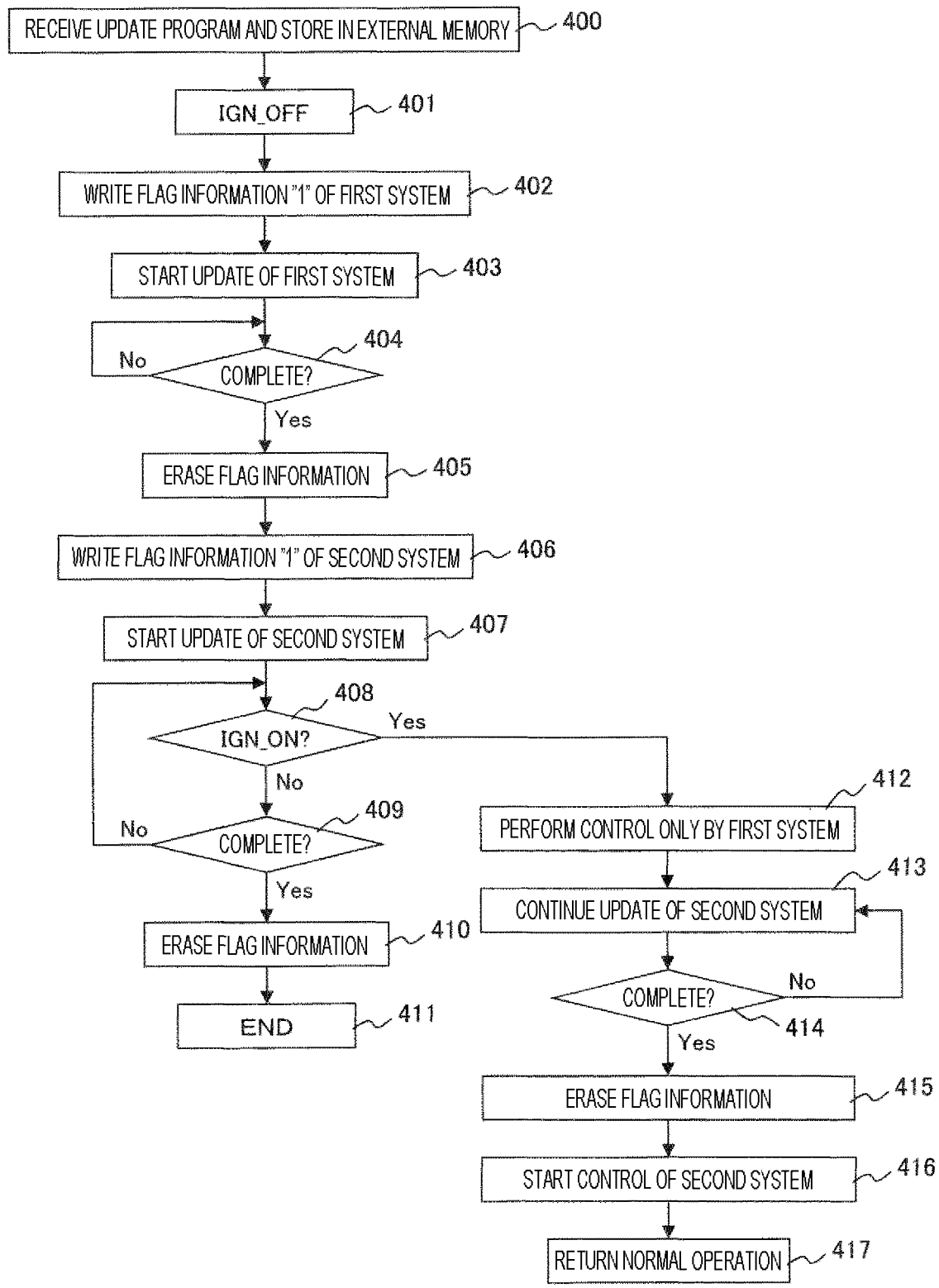
FIG. 3 is a flowchart illustrating an operation of the load drive control device according to the first embodiment.

FIG. 3 is a flowchart illustrating an operation of the load drive control device according to the present embodiment.

When the IGN is turned on during the program update of the second system, the operation is performed as illustrated in FIG. 3. First, the update program for the microcomputer is received and stored in the update region 122 (222) in the external nonvolatile memory 121 (221) of each of the first system and the second system. (Step 400)

Then, when the IGN is turned off (Step 401), the flag information "1" of the first system is written in a specific region of the data flash region 112. (Step 402)

Thereafter, the update program is read from the update region 122 of the external nonvolatile memory 121, and the update of the microcomputer program of the first system is started. (Step 403)

Then, it is determined that the update of the first system is completed/not completed (Step 404), and when it is determined that the update of the first system is completed, the flag information written in the specific region of the data flash region 112 is erased to be "0" (Step 405), and then the flag information "1" of the second system is written in the specific region of the data flash region 212 (Step 406), and the program update of the second system is started. (Step 407)

When the IGN is turned on during the update of the second system (Step 408), the load drive control system starts to drive the motor load 7 in accordance with the ON instruction of the IGN. At this time, since the program of the second system is being updated, the motor load 7 is driven and controlled only by the load drive control circuit 100 of the first system. (Step 412)

At this time, the update of the program of the second system is continuously executed (Step 413), and when the update is completed (Step 414), the flag information written in the specific region of the data flash region 212 is erased to be "0" (Step 415), the drive control of the motor load 7 by the second system is started (Step 416), and the normal control operation is performed in the redundant configuration of the first system and the second system. (Step 417)

When the IGN is not turned on during the update of the second system and the update of the second system is completed (Step 409), the flag information written in the specific region of the data flash region 212 after the update is completed is erased to be "0" (Step 410), and the program update by the OTA ends. (Step 411) Next, after the IGN is turned on, the motor load 7 is driven by the newly updated program in both the first system and the second system.

That is, in the redundant system in which one load (motor load 7) is controlled by a plurality of control systems (load drive control circuits 100 and 200) having a redundant configuration, when receiving the update program signals 4 of the plurality of control systems (load drive control circuits 100 and 200), the redundant system of the present embodiment illustrated in FIG. 3 individually executes the update of the control program for each of the plurality of control systems (load drive control circuits 100 and 200) in a predetermined order, and when receiving a start request (IGN_SW signal 5) of the load (motor load 7) while executing the update of the control program of one predetermined system (load drive control circuit 200: second system), the redundant system controls the load (motor load 7) by a system other than the one predetermined system (load drive control circuit 100: first system), during that time, the update of the control program of the one predetermined system (load drive control circuit 200: second system) is continued.

Figure 4:
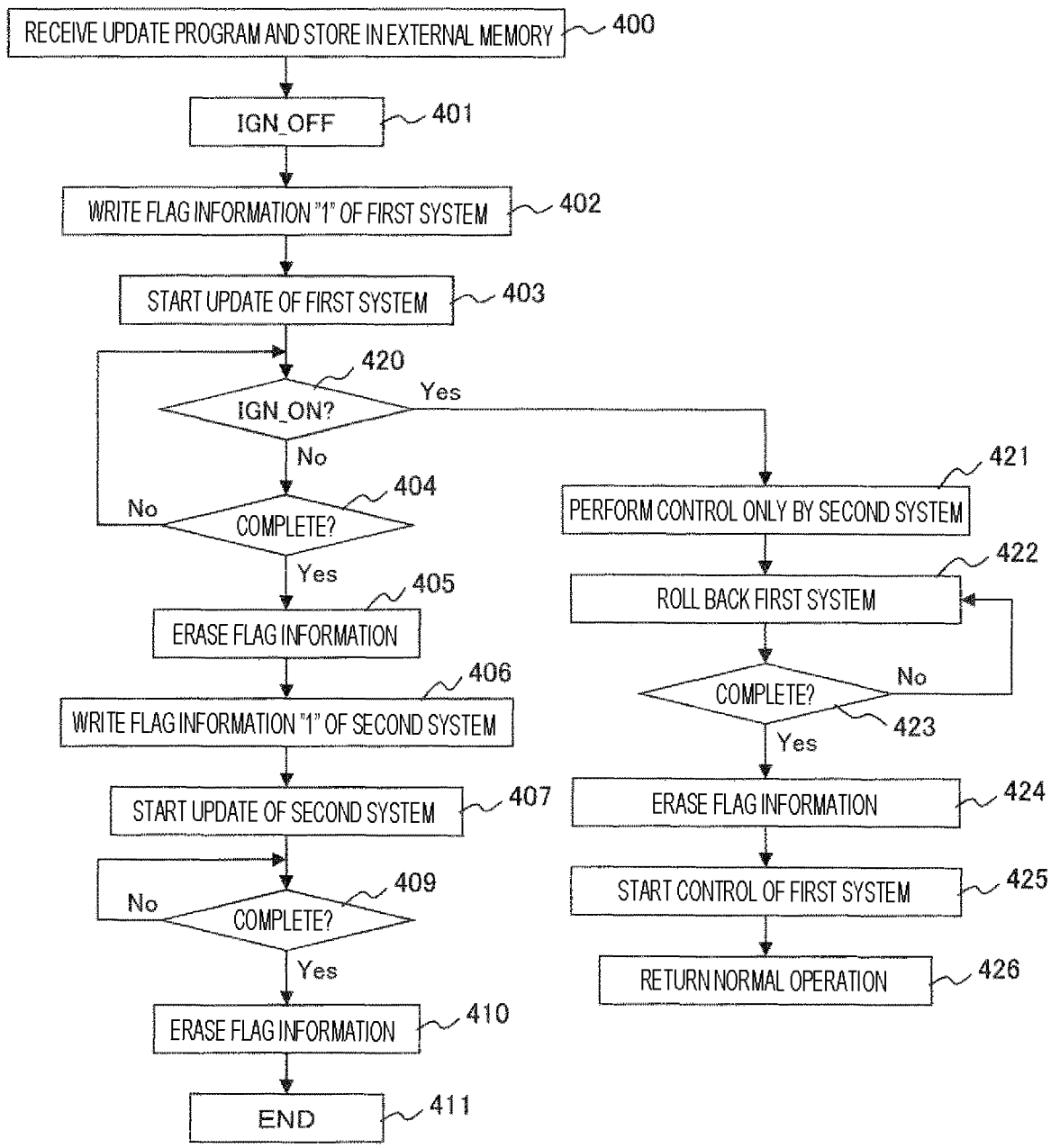
FIG. 4 is a flowchart illustrating an operation of the load drive control device according to the first embodiment.

On the other hand, in a case where the IGN is turned on while the program of the first system is updated, the operation is performed as illustrated in FIG. 4. First, the update program for the microcomputer is received and stored in the update region 122 (222) in the external nonvolatile memory 121 (221) of each of the first system and the second system. (Step 400)

Then, when the IGN is turned off (Step 401), the flag information "1" of the first system is written in a specific region of the data flash region 112. (Step 402)

Thereafter, the update program is read from the update region 122 of the external nonvolatile memory 121, and the update of the microcomputer program of the first system is started. (Step 403)

When it is determined that the IGN is turned on or off during the update of the first system (Step 420) and it is determined to be turned on, first, the drive control of the motor load 7 by only the second system is started. (Step 421)

Thereafter, the program before the update is read from the backup region 123 of the external nonvolatile memory 121, and the program during the update of the first system is rolled back (the program is returned to the state before the update). (Step 422)

When the rollback is completed (Step 423), the flag information written in the specific region of the data flash region 112 is erased and becomes "0" (Step 424).

Thereafter, the drive control of the first system is started (Step 425), and both the first system and the second system perform the normal control operation in the redundant configuration by the program before update. (Step 426)

That is, in the redundant system in which one load (motor load 7) is controlled by a plurality of control systems (load drive control circuits 100 and 200) having a redundant configuration, when receiving the update program signals 4 of the plurality of control systems (load drive control circuits 100 and 200), the redundant system of the present embodiment illustrated in FIG. 4 individually executes the update of the control program for each of the plurality of control systems (load drive control circuits 100 and 200) in a predetermined order, and when receiving a start request (IGN_SW signal 5) of the load (motor load 7) while executing the update of the control program of one predetermined system (load drive control circuit 100: first system), the redundant system controls the load (motor load 7) by a system other than the one predetermined system (load drive control circuit 200: second system), during that time, the rollback of the control program of the one predetermined system (load drive control circuit 100: first system) is executed.

This operation will be described in more detail with reference to the timing charts of FIGS. 5 to 7.

Figure 5:
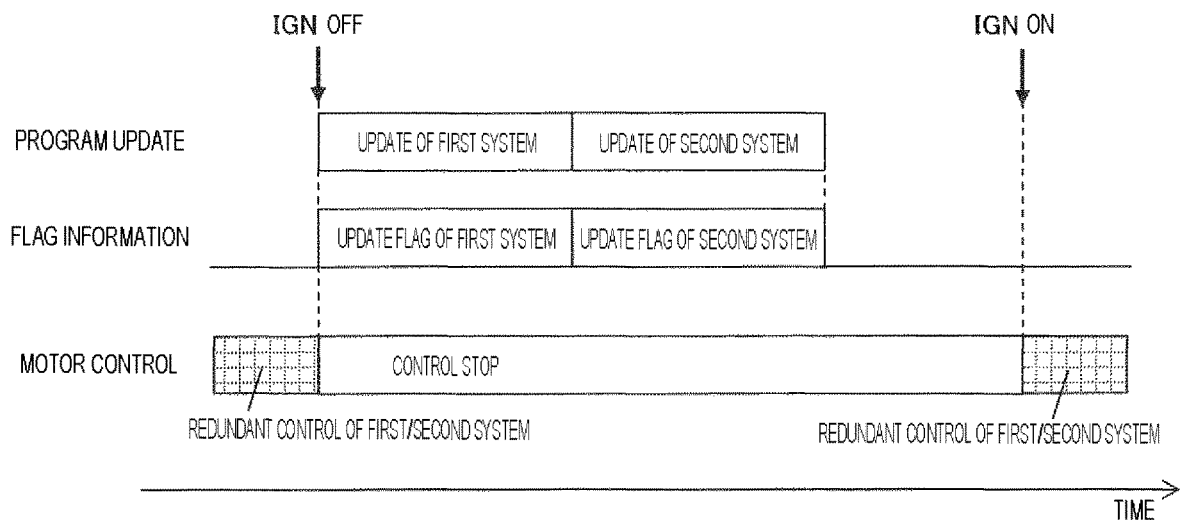
FIG. 5 is a timing chart illustrating an operation of the load drive control device according to the first embodiment.

FIG. 5 illustrates a case where the IGN is not turned on during the program update of each of the first system and the second system. In this case, the program is updated in order of the first system→the second system after the IGN is turned off, and after the update is completed for both the first system and the second system, the redundant drive control by the first/second system (all systems) is performed after the IGN is turned on next.

Figure 6:
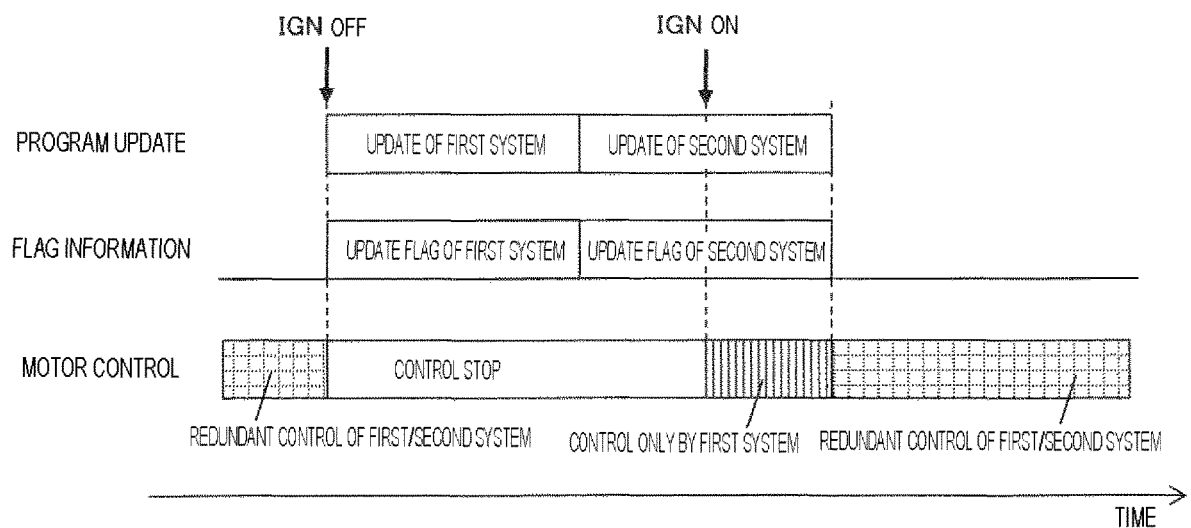
FIG. 6 is a timing chart illustrating an operation of the load drive control device according to the first embodiment.

FIG. 6 illustrates a case where the IGN is turned on during the program update of the second system. Immediately after the IGN is turned on, the program update of the second system is continued while the control is performed only by the first system, and after the update of the second system is completed, the redundant drive control is performed by the first/second systems (all systems).

Figure 7:
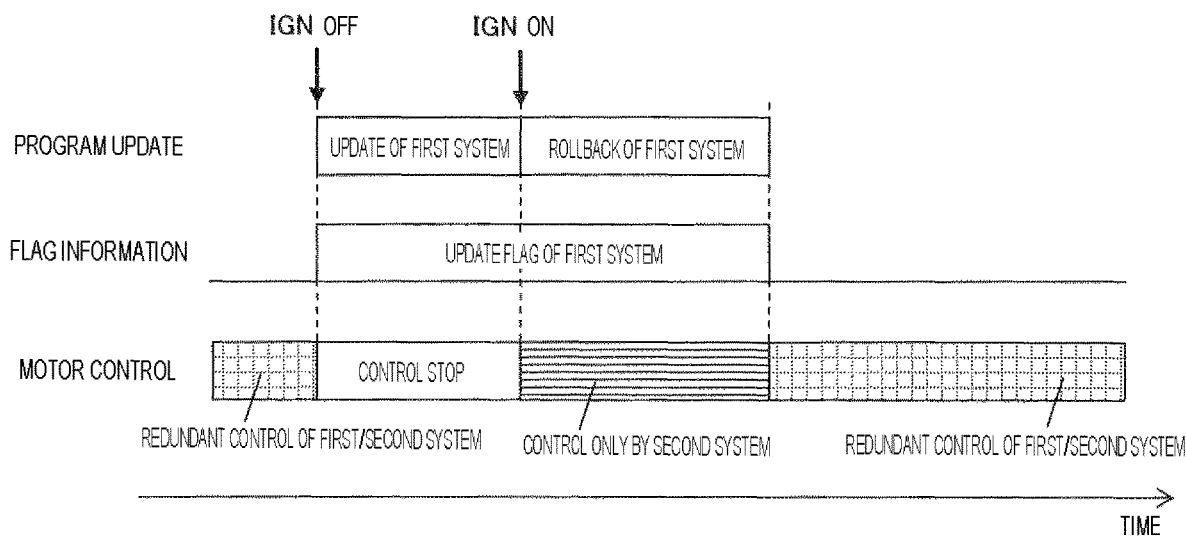
FIG. 7 is a timing chart illustrating an operation of the load drive control device according to the first embodiment.

FIG. 7 illustrates a case where the IGN is turned on during the program update of the first system. Immediately after the IGN is turned on, the program of the first system is rolled back while the control is performed only in the second system, and after completion of the rollback, redundant drive control is performed by the first/second systems (all systems).

By performing such control, even in a case where either the first system or the second system is being updated, it is possible to immediately start the drive control of the motor load 7 without waiting for completion of the update after the IGN is turned on.

In addition, as illustrated in FIG. 6, in a case where the IGN is turned on during the update of the second system, the update of the program of the second system is continued, and when the IGN is turned on during the update of the first system, as illustrated in FIG. 7, the state is returned to the state before the update by the rollback of the first system, so that the versions of the programs of the first system and the second system can be returned to the normal state in the shortest time without being different, and a highly reliable load drive control device can be provided.

Since the present embodiment describes the case of the redundant configuration with two systems, the program update is performed in order of the first system→the second system, and the rollback control is performed at a point that is half the entire program update time, that is, the IGN ON state during the update of the first system, and update continuation control is performed during the update of the second system.

The same can be applied even in the case of a redundant configuration of three or more systems. In a case where the program is updated in order of the first system→the second system→the third system as in the modification illustrated in FIG. 8, when the IGN is turned on before a point which is half of the entire program update time (reference numeral 430 in FIG. 8), that is, the center point of the update time of the second system, the rollback control is performed, and when the IGN is turned on after the center point, the update continuation control is performed. As in the case of the redundancy control of two systems, it is possible to always return to the normal state in the shortest time, and it is possible to provide a highly reliable load drive control device.

Figure 8:
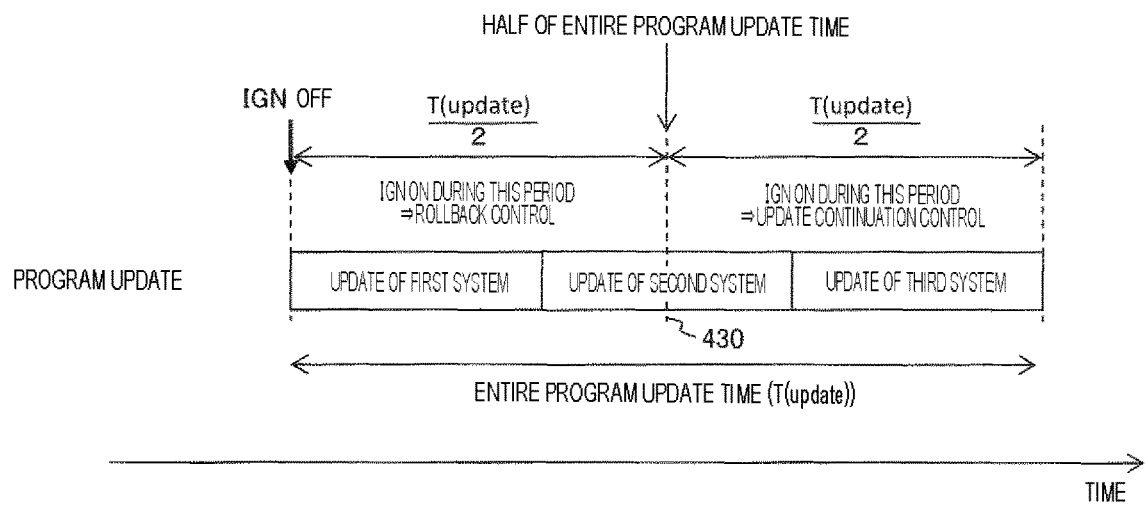
FIG. 8 is a timing chart illustrating an operation of a load drive control device according to a modification of the first embodiment.

That is, when receiving the start request (IGN_SW signal 5) of the load (motor load 7), the redundant system of the present embodiment illustrated in FIG. 8 executes the rollback of the control program of the one predetermined system (second system) if it is less than half of the entire control program update time of the plurality of control systems (first system, second system, and third system), and continues the update of the control program of the one predetermined system (second system) if it is more than half of the entire control program update time.

Figure 9:
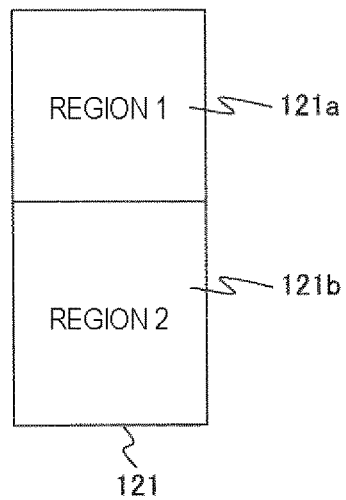
FIG. 9 is a configuration diagram of an external nonvolatile memory of the load drive control device according to the first embodiment.
Figure 10:
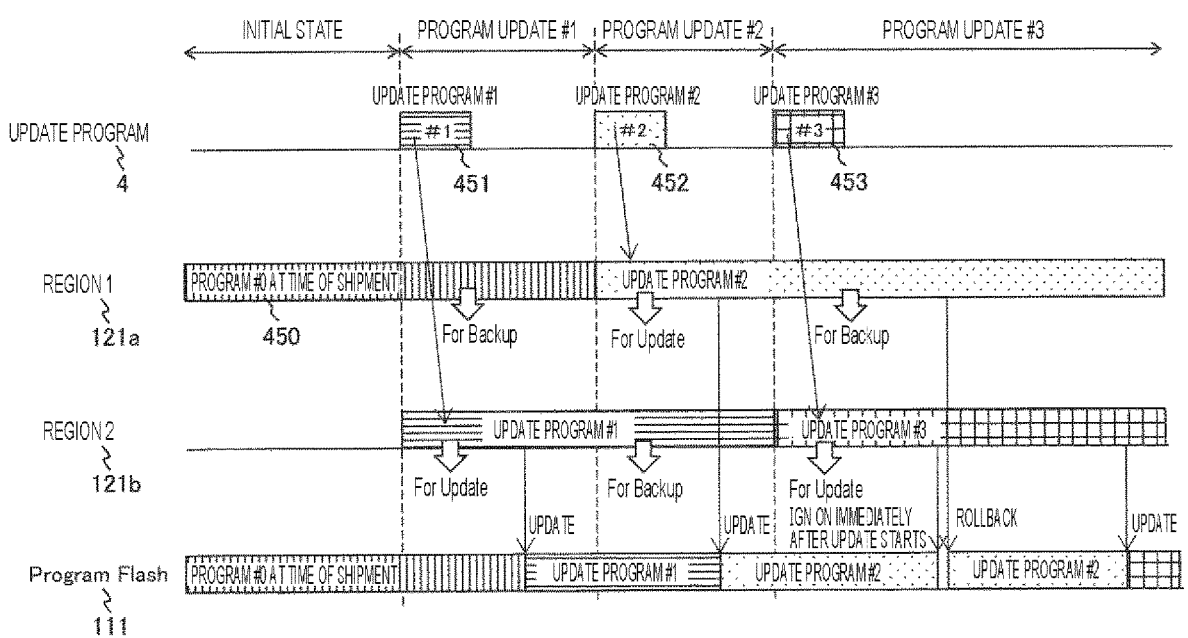
FIG. 10 is a diagram illustrating an operation state of an external nonvolatile memory of the load drive control device according to the first embodiment.

In addition, the present embodiment also has the following effects. FIGS. 9 and 10 are configuration diagrams illustrating an initial state of the external nonvolatile memory at the time of product shipment or the like, a program storage region of the external nonvolatile memory 121 in a case where an update program is downloaded and the program is updated, the program flash region 111 of the internal nonvolatile memory, and the state of storage of the update program.

As illustrated in FIG. 9, a plurality of regions such as a region 1 (121a) and a region 2 (121b) are secured in the external nonvolatile memory 121 in order to store an update program and a backup program. In an initial state at the time of product shipment of the external nonvolatile memory, a program 450 at the time of shipment is written on the region 1 side.

In a case where the update program 4 is downloaded into the external nonvolatile memory, the operation is as illustrated in FIG. 10. First, an update program #1 (451) downloaded for the first time is written on the region 2 side. As a result, the program on the region 2 side is for update, and the program 450 at the time of shipment is for backup. Then, after IGN is turned off, the update program #1 (451) in the region 2 (121b) is read to update the content of the program flash region 111 of the internal nonvolatile memory.

An update program #2 (452) downloaded the second time is written on the region 1 side, and the program on the region 2 side is not changed. Therefore, the program on the region 1 side is for update, and the program on the region 2 side is for backup. Then, after the IGN is turned off, the update program #2 (452) in the region 1 (121a) is read, and the content of the program flash region 111 of the internal nonvolatile memory is similarly updated.

An update program #3 (453) downloaded the third time is written on the region 2 side, and the program on the region 1 side is not changed. Therefore, the program on the region 2 side is for update, and the program on the region 1 side is for backup. Then, after the IGN is turned off, the update program #3 (453) in the region 2 (121b) is read to start updating the content of the program flash region 111 of the internal nonvolatile memory.

However, in a case where the IGN is turned on immediately after the start, the program flash region 111 of the internal nonvolatile memory is still in the middle of updating, and it is faster to return to the normal state if the rollback is performed, the update program #2 (452) held for backup is read from the region 1 (121a), the content of the program flash region 111 is written back to the state where the original update program #2 (452) is written, and the rollback process is performed.

Thereafter, after IGN is turned off again, the update program #3 (453) in the region 2 (121b) is read, and the content of the program flash region 111 is updated to the update program #3 (453).

That is, when the start request (IGN_SW signal 5) of the load (motor load 7) is received, the redundant system according to the present embodiment illustrated in FIG. 10 executes the rollback of the control program of the one predetermined system if the number of update completion systems is less than half of the total number of systems, and the control program of the one predetermined system is rolled back, and if the number of update completion systems is equal to or more than half of the total number of systems, the control program of the one predetermined system is continuously updated.

In addition, there is provided a nonvolatile memory (internal nonvolatile memory 109 (209)) that stores correction data of each system of the plurality of control systems (load drive control circuits 100 and 200), and after the update of a predetermined control program of one system or the rollback is completed, the correction data of each system stored in the nonvolatile memory (internal nonvolatile memory 109 (209)) is read, and the load (motor load 7) is controlled in all the systems using the read correction data.

In addition, each of the plurality of control systems (load drive control circuits 100 and 200) includes the microcomputer 103 (203) that controls writing of a control program and the external nonvolatile memory 121 (221) disposed outside the microcomputer 103 (203), and the external nonvolatile memory 121 (221) stores an update program and a backup program. In the case of receiving the update program signal 4, the received update program is overwritten on the program for backup last time, and the program for update last time is used for backup.

In this way, by alternately storing the downloaded update program 4 in each region in the external nonvolatile memory 121, it is possible to always distinguish and store for update and backup.

In the initial state, by storing the program 450 at the time of shipment in the external nonvolatile memory 121 in advance, the backup program and the update program can be stored separately from each other from the time of the first program update, so that it is possible to smoothly perform the operation of updating/rolling back the program when IGN_SW is turned on as described above.

In addition, processing such as rewriting the update program to the backup program region or writing data of the internal nonvolatile memory of the microcomputer to the external nonvolatile memory is unnecessary each time the program is updated, and an increase in the load of the CPU and the writing time can be prevented, so that the control using the external nonvolatile memory can be more efficiently performed.

Note that, in the present embodiment, a signal is input via the gateway unit 3, but this is not necessarily an essential means, and it is obvious that the same operation is performed even in a case where the update program signal 4 is directly input from the outside without passing via the gateway unit 3.

The present embodiment has been explained about the configuration in which the program for update/backup is stored in the external nonvolatile memory 121 (221) connected to the microcomputer 103 (203). However, it is obvious that the same operation can be realized even if the gateway unit 3 is caused to hold the nonvolatile memory, the program for update/backup of each of the first and second systems is caused to be stored, data is requested via a communication unit 107 (207) according to the situation of update/rollback, and rewriting is performed.

In the present embodiment, the system power source 11 has a single configuration, but may have a redundant configuration in which power is also supplied from another system power source.

Second Embodiment

A redundant system according to a second embodiment of the present invention and a load drive control device using the redundant system will be described with reference to FIGS. 11 to 16.

Figure 11:
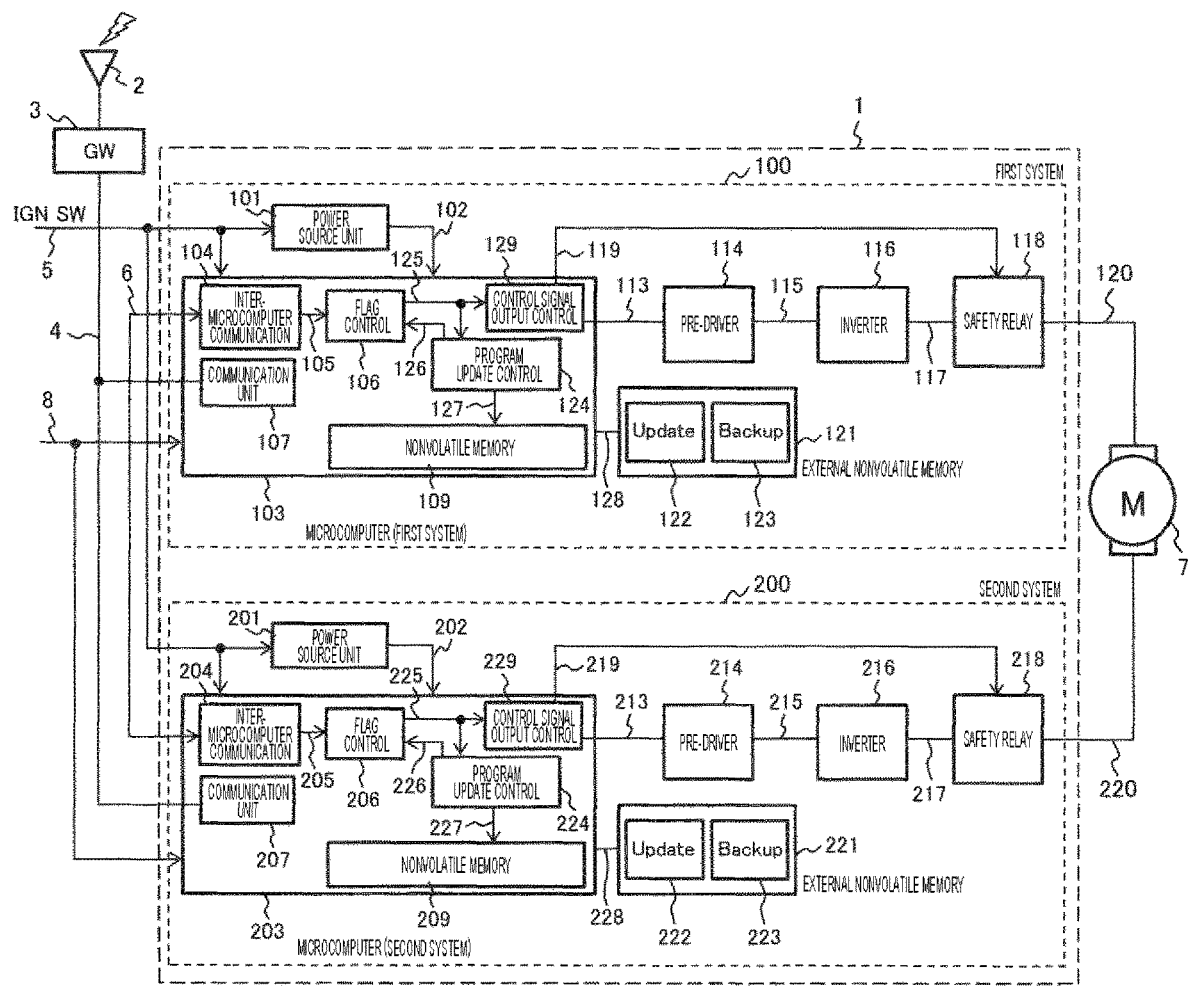
FIG. 11 is a block diagram illustrating a configuration of a load drive control device according to a second embodiment.

FIG. 11 is a block diagram illustrating a configuration of the load drive control device according to the present embodiment. As illustrated in FIG. 11, the load drive control device 1 of the present embodiment is different from the load drive control device of the first embodiment (FIG. 2) in that a control signal output unit 129 (229) is provided in the microcomputer 103 (203).

The flag signal 125 (225) is input to the control signal output unit 129 (229), and outputs a load drive signal 113 (213) for driving the motor load 7 and the safety relay control signal 119 (219). The other configurations are the same as those of the first embodiment.

Figure 12:
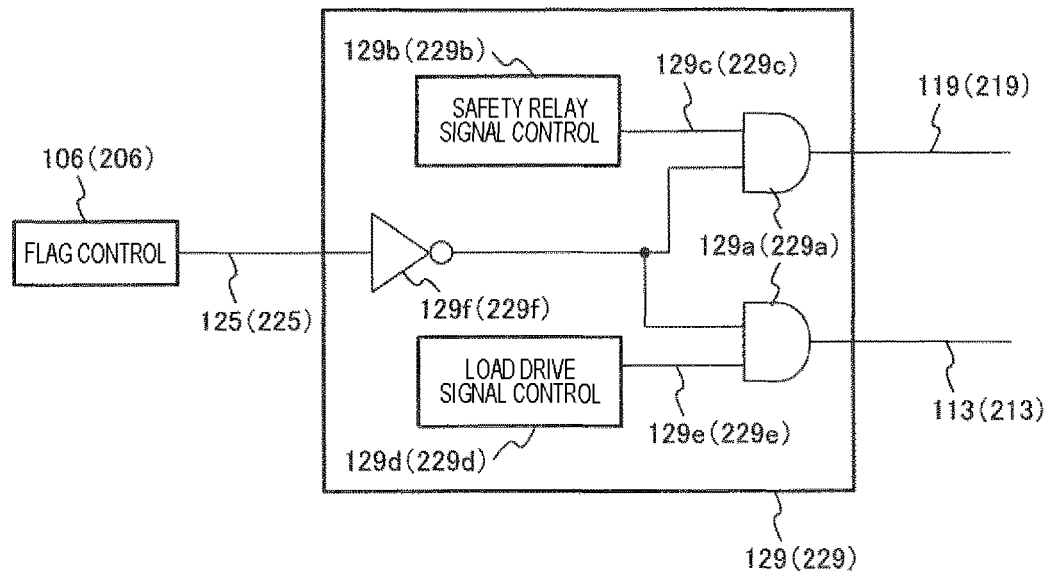
FIG. 12 is a diagram illustrating an internal configuration of a control signal output unit in FIG. 11.

FIG. 12 is a diagram illustrating an internal configuration of the control signal output unit 129 (229). In FIG. 12, reference numeral 129 (229) denotes a control signal output unit, 129a (229a) denotes a gate circuit that limits outputs of the safety relay control signal 119 (219) and the load drive signal 113 (213) according to the input flag signal 125 (225), 129b (229b) denotes a safety relay signal control unit, 129c (229c) denotes a safety relay signal control signal, 129d (229d) denotes a load drive signal control unit, 129e (229e) denotes a load drive signal control signal, and 129f (229f) denotes an inversion buffer that inverts the input flag signal.

Figure 13:
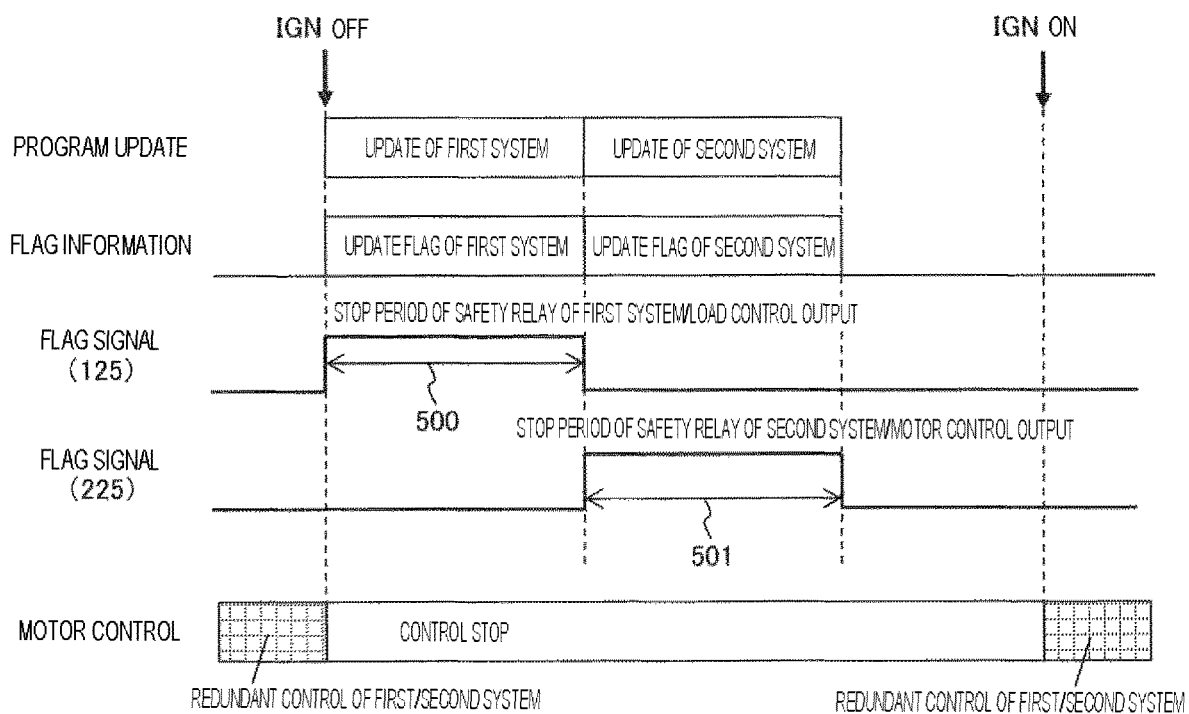
FIG. 13 is a timing chart illustrating an operation of the load drive control device according to the second embodiment.

Next, the operation of the load drive control device of the present embodiment will be described with reference to FIGS. 13 to 16. FIG. 13 illustrates a case where the IGN is not turned on during the program update of each of the first system and the second system. As described in the first embodiment, the update of the program of the first system is started when the IGN is turned off, "1" is written in the update flag of the first system, the flag signal 125 becomes "1", and is input to the control signal output unit 129.

In this case, since the signal is inverted by the inversion buffer 129f and "0" is input to the gate circuit 129a, the outputs of the safety relay control signal 119 and the load drive signal 113 of the first system are forcibly stopped during the period in which the first system update flag is "1" as indicated by reference numeral 500 in FIG. 13.

The same applies to a case where the program of the second system is updated. Since the update flag of the second system is "1" at the time of updating the second system, the flag signal 225 of "1" is input to the control signal output unit 229. In this case, since the signal is inverted by the inversion buffer 229f and "0" is input to the gate circuit 229a, the outputs of the safety relay signal 219 and the load drive signal 213 of the second system are forcibly stopped during the period in which the update flag of the second system is "1" as indicated by reference numeral 501 in FIG. 13.

Figure 14:
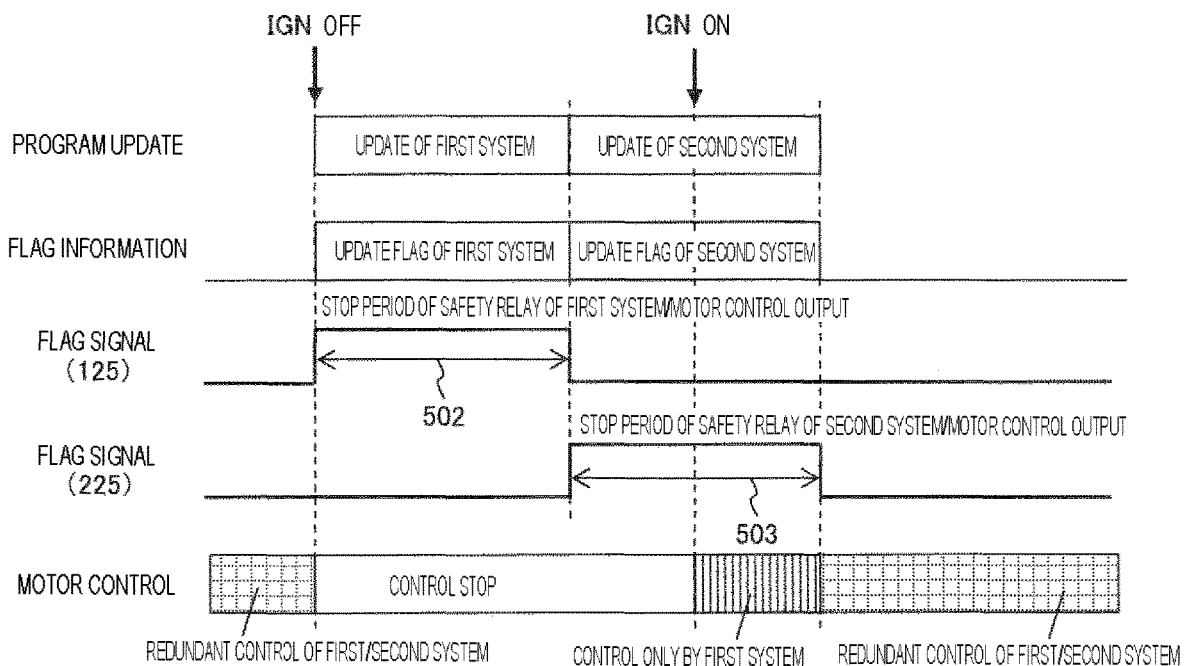
FIG. 14 is a timing chart illustrating an operation of the load drive control device according to the second embodiment.

FIG. 14 illustrates a case where the IGN is turned on during the update of the program of the second system. In the case of FIG. 14, since the IGN is turned on during the program update of the second system, the motor load 7 starts to operate during the program update. However, as described in FIG. 13, since the second system update flag is "1" during the program update of the second system, the outputs of the safety relay control signal 219 and the load drive signal 213 of the second system are forcibly stopped by the operation of the control signal output unit 229. (reference numeral 503 in FIG. 14)

As a result, the control of the motor load 7 is performed only in the first system in which the update of the program is ended, and the motor load 7 can be operated normally.

Figure 15:
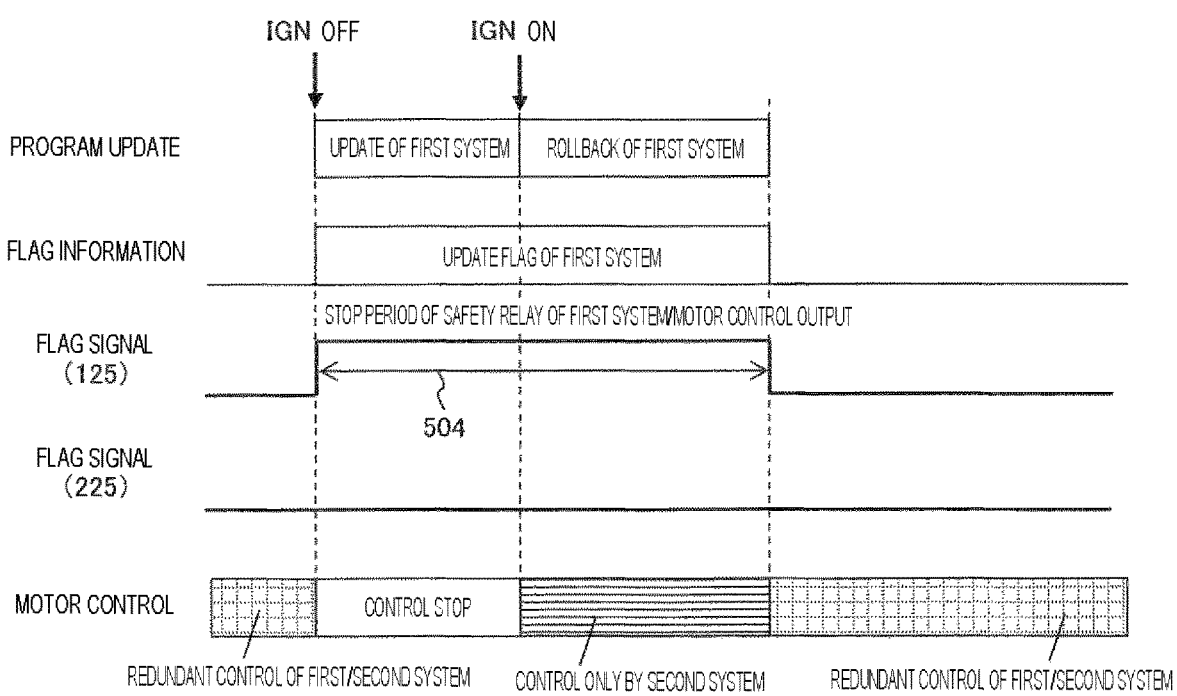
FIG. 15 is a timing chart illustrating an operation of the load drive control device according to the second embodiment.

FIG. 15 illustrates a case where the IGN is turned on during the update of the program of the first system. In the case of FIG. 15, since the IGN is turned on during the program update of the first system, the motor load 7 starts to operate during the program update. However, as described in FIGS. 13 and 14, since the first system update flag is "1" during the program update of the first system, the outputs of the safety relay control signal 119 and the load drive signal 113 of the first system is forcibly stopped by the operation of the control signal output unit 129. (reference numeral 504 in FIG. 15)

Therefore, the control of the motor load 7 is performed only in the second system in which the update of the program is not ended, and the motor load 7 can be operated normally.

As a result, at the time of updating the program of each system, the safety relay control signal and the load drive signal are reliably brought into the output stop state by the flag signal 125 (225) of each system or the signal based on the flag signal, so that the load drive signal is not erroneously output during the program update and the operation abnormality of the motor load 7 does not occur, and the highly reliable load drive control device can be provided.

In addition, the flag control unit 106 (206) described in the first embodiment and the second embodiment has the following advantages. As illustrated in the block diagrams of FIGS. 2 and 11, the microcomputer 103 of the first system and the microcomputer 203 of the second system are connected by the microcomputer mutual communication signal 6, and are configured to monitor the other flag information with each other, so that the flag states of the microcomputers can be grasped.

At this time, as illustrated in the truth table of FIG. 16, by mutually monitoring the first system flag and the second system flag and prohibiting the first system flag and the second system flag from being simultaneously in the "1" state, it is possible to realize control such that the first system and the second system are not simultaneously in the program update state.

In the redundant system of the present embodiment, each of the plurality of control systems (the load drive control circuits 100 and 200) includes the control signal output unit 129 (229) that outputs the control signals (the load drive signal 113 (213) and the safety relay control signal 119 (219)) based on the flag signal 125 (225), and in a case where the flag signal 125 (225) is in an abnormal state, the control of the load (the motor load 7) is limited by the control signals (the load drive signal 113 (213) and the safety relay control signal 119 (219)) from the control signal output unit 129 (229).

In addition, the control of the load (motor load 7) is limited by the control signals (the load drive signal 113 (213) and the safety relay control signal 119 (219)) from the control signal output unit 129 (229) according to the control program update state of each system of the plurality of control systems (the load drive control circuits 100 and 200).

As a result, the program of each system is not simultaneously updated, and even in a case where the IGN is turned on while the program of any system is being updated, the operation of the motor load 7 is immediately started by the system that is not updated. Therefore, it is possible to provide a load drive control device that is highly reliable and easy to use.

Third Embodiment

A redundant system according to a third embodiment of the present invention and a load drive control device using the redundant system will be described with reference to FIGS. 17 to 19.

Figure 17:
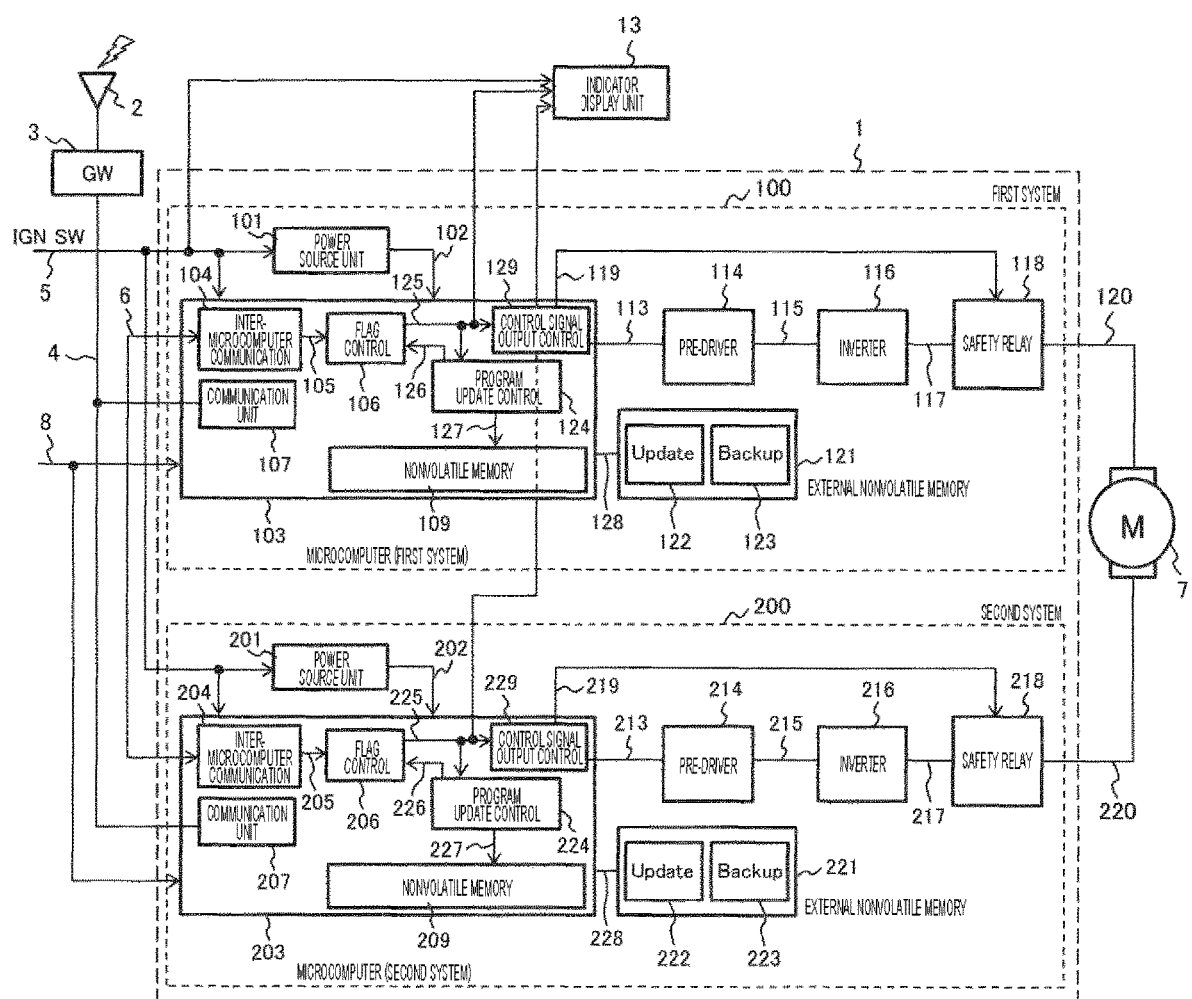
FIG. 17 is a block diagram illustrating a configuration of a load drive control device according to a third embodiment.
Figure 18:
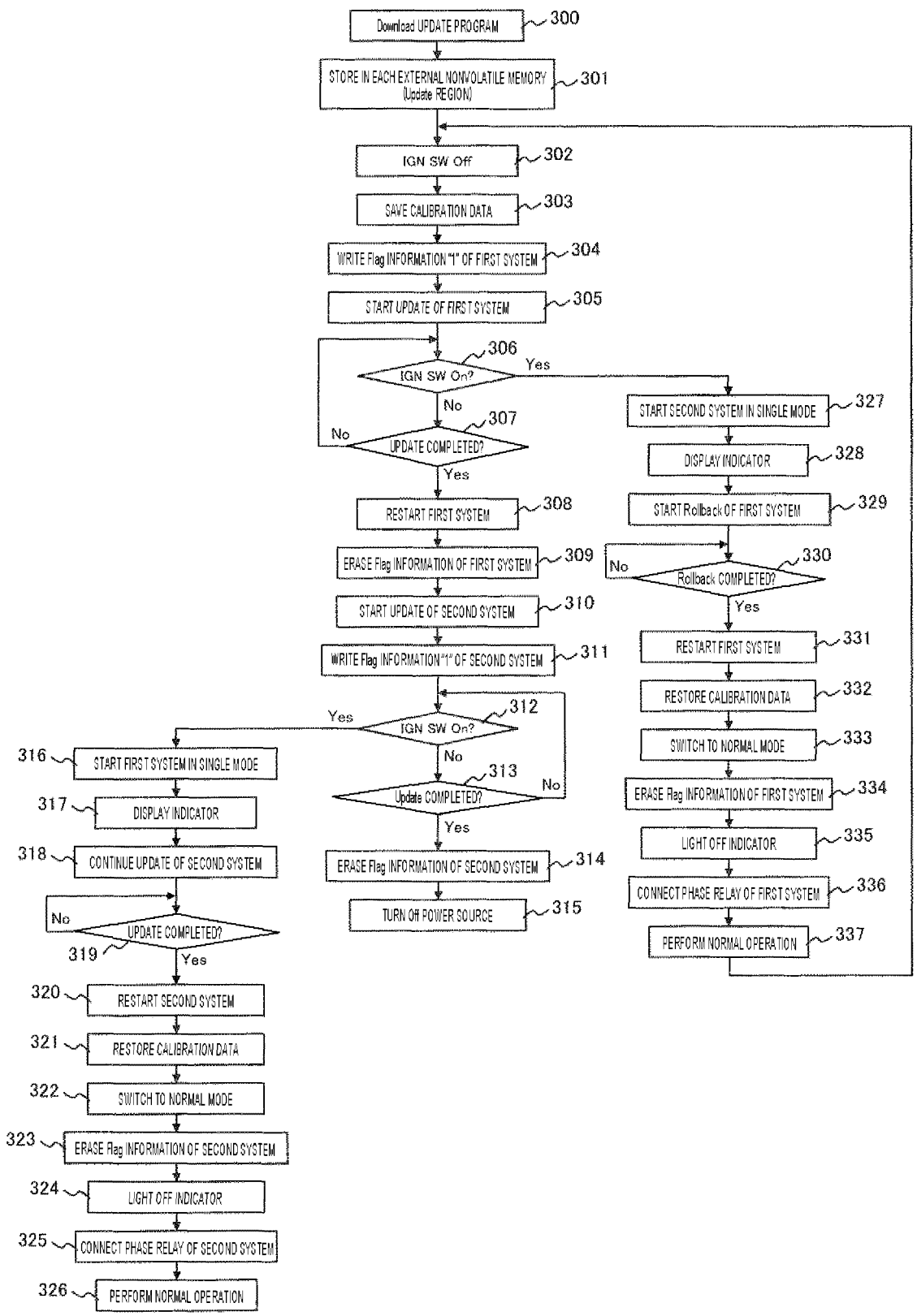
FIG. 18 is a flowchart illustrating an operation of the load drive control device according to the third embodiment.

FIG. 17 is a block diagram illustrating a configuration of the load drive control device according to the present embodiment. As illustrated in FIG. 17, the load drive control device 1 of the present embodiment is different from the load drive control device of the second embodiment (FIG. 11) in that an indicator display unit 13 is provided, the IGN_SW signal 5 and the flag signal 125 (225) are input, and the indicator clearly indicating the state of the load drive control circuit is displayed to the driver.

As illustrated in FIG. 2, the internal nonvolatile memory 109 (209) includes the boot loader region 110 (210), the program flash region 111 (211), and the data flash region 112 (212). For example, calibration data for system control is stored in the data flash region 112 (212).

Next, a system operation of the load drive control device of the present embodiment will be described with reference to FIG. 18. After the update program signal 4 is downloaded via the gateway unit 3 (Step 300), the update program signal 4 is stored in each external nonvolatile memory (update region) (Step 301).

Thereafter, when the IGN_SW is turned off (Step 302), the calibration data of the system is stored in the data flash regions 112 and 212 (Step 303).

Thereafter, the flag information "1" of the first system is written (Step 304), and the program update of the first system is started (Step 305).

When the IGN_SW is turned on before the update is completed, the system operation is activated by the second system alone (Step 327). In this case, since the first system performs the program update and operates only in the second system, an indicator for notifying the driver of the operation is displayed (Step 328).

The flag information of the first system and the second system and the display state of the indicator by the IGN_SW will be described with reference to FIG. 19. In a case where the IGN_SW is in the OFF state, since the motor load 7 is not driven, the indicator is not displayed without displaying of the indicator regardless of the flag information. (No. 1~No. 4)

On the other hand, in a case where the IGN_SW is in the ON state, that is, when the motor load 7 is driven, when the flag information is in the state of "1", that is, in a case where the program is updated, the indicator is displayed. (No. 6~No. 8)

As a result, the driver can grasp that the operation is performed only on one system side of the system having the redundant configuration, and for example, even if the driver feels an operation abnormality such as insufficient output due to the control of only one system, it is possible to cope with appropriate safety operation or the like.

In addition, since the state can be notified to the driver by the indicator, there is also an advantage that the driver does not feel unnecessary anxiety.

The same applies to the case where only the first system is operating alone (Step 316) at the time of program update on the second system side, and when the IGN is turned on before the program update of the second system is completed and the first system starts operating alone (Step 316), the indicator for notifying the driver of this is displayed as illustrated in FIG. 19 (Step 317).

As a result, the driver can grasp that the operation is performed only on one system side of the system having the redundant configuration, and for example, even if the driver feels an operation abnormality such as insufficient output due to the control of only one system, it is possible to cope with appropriate safety operation or the like.

As described with reference to FIG. 16, the flag information of the first system/the second system is prohibited from being in the state of "1", and there is no case where the first system and the second system are in the state (No. 8 in FIG. 19). However, there is also an advantage that it is possible to notify the driver of a clear abnormal state by displaying the indicator in preparation for a case where the state of No. 8 occurs due to some reason.

The present embodiment also has the following effects. After the update program signal 4 is downloaded and stored in the external nonvolatile memory of each system (Step 301), the program of each system is updated after the IGN_SW is turned off. Before the update, the calibration data of the system is saved and stored in the data flash region 112 or 212 of the internal nonvolatile memory (Step 303).

After the program update of the first system, when the IGN is turned on during the update of the second system, control is performed such that the IGN is activated in the single mode of only the first system (Step 316), the update of the second system is continued during that time, the second system is restarted when the update is completed (Step 320), and the mode shifts to the normal drive mode.

At this time, since the data for calibration of the system is saved in advance in the data flash region 112 or 212, even in a case where the second system is restarted, it is possible to shift to the normal mode and control the normal motor load 7 only by reading and restoring the saved data for calibration (Step 321) without performing calibration again, and it is possible to provide a load drive control device with good usability.

This operation is similar even in a case where the IGN is turned on during the program update of the first system (Step 306), the driving of the second system alone is started after the IGN is turned on (Step 327), and rollback is performed in the program of the first system (Step 329).

When the rollback is completed, the first system is restarted (Step 331), and the mode is shifted to the normal mode. However, by reading the calibration data that has been saved and restoring the data (Step 332), the first system can be operated in the normal mode without performing the system calibration after the first system is restarted. Therefore, it is possible to provide a load drive control device with good usability.

Fourth Embodiment

A redundant system according to a fourth embodiment of the present invention and a load drive control device using the redundant system will be described with reference to FIGS. 20 and 21.

Figure 20:
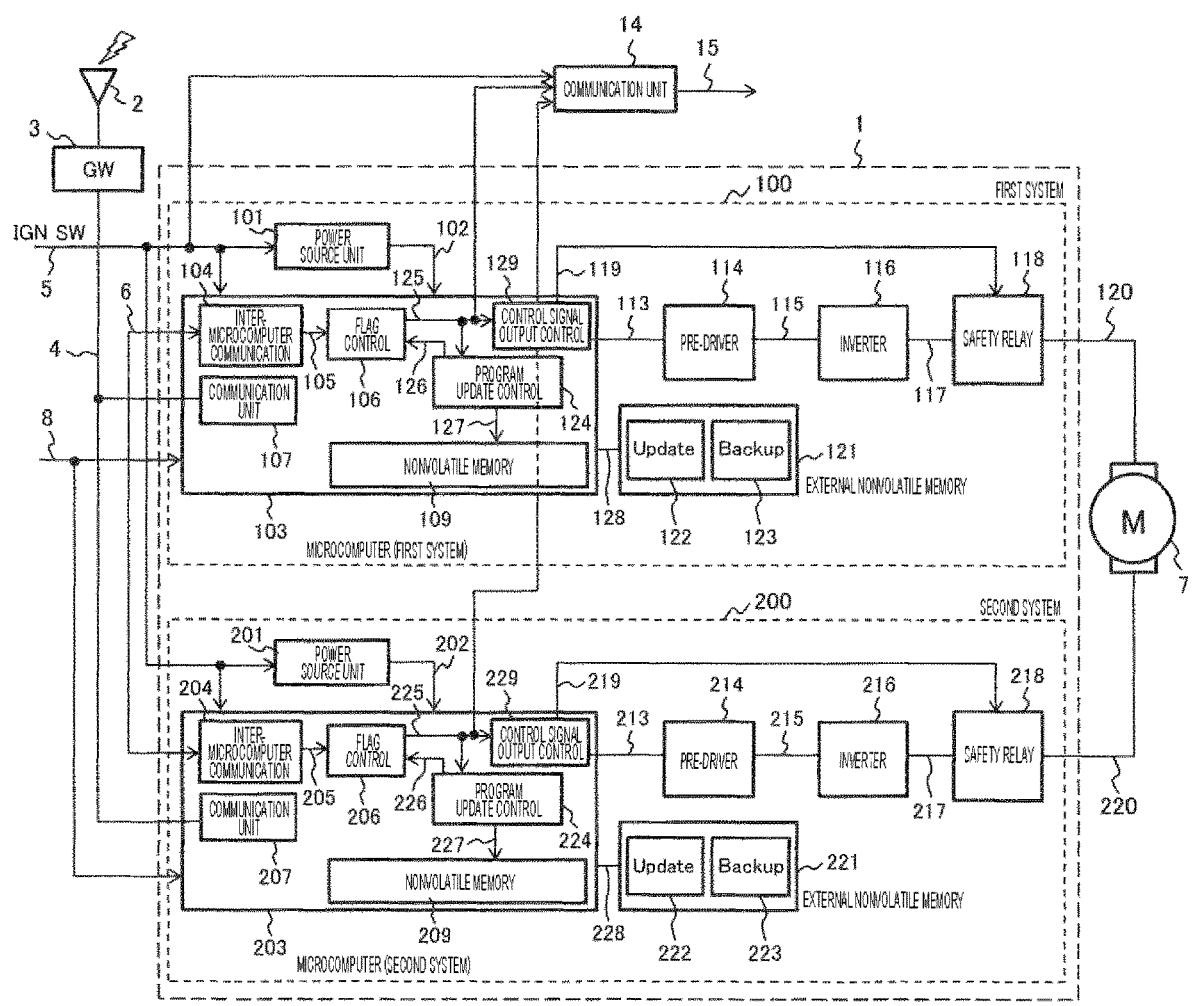
FIG. 20 is a block diagram illustrating a configuration of a load drive control device according to a fourth embodiment.

FIG. 20 is a block diagram illustrating a configuration of the load drive control device according to the present embodiment. As illustrated in FIG. 20, the load drive control device 1 of the present embodiment is provided with a communication unit 14, and receives the IGN_SW signal 5 and the flag control signals 125 and 225 of the first system and the second system.

The communication unit 14 is connected to an external ECU (not illustrated) to perform communication, and communicates with the external ECU by an ECU communication signal 15. The other configurations are the same as those of the first to third embodiments.

Next, the operation of the load drive control device of the present embodiment will be described with reference to FIG. 21. FIG. 21 illustrates the flag information of the first system and the second system and the state of the communication unit 14 by the IGN_SW. In a case where the IGN_SW is in the OFF state, since the motor load 7 is not driven, communication to the external ECU is not performed regardless of the flag information.

On the other hand, in a case where the IGN_SW is in the ON state, that is, when the motor load 7 is driven, when the flag information of the first system or the second system is in the state of "1", that is, in a case where the program is updated, communication from the communication unit 14 to the external ECU is performed by the ECU communication signal 15.

As a result, it is possible to grasp that the external ECU is operating only on one system side of the system having the redundant configuration, and it is possible to cope with appropriate safety operation and the like corresponding thereto.

As described with reference to FIG. 16, the flag information of the first system/the second system is prohibited from being in the state of "1", and the first system and the second system do not enter this state (No. 8 in FIG. 21). However, even in a case where the state of No. 8 occurs for some reason, there is an advantage that it is possible to notify the external ECU of the abnormality by performing communication to the external ECU.

Fifth Embodiment

A redundant system according to a fifth embodiment of the present invention and a load drive control device using the redundant system will be described with reference to FIG. 22.

Figure 22:
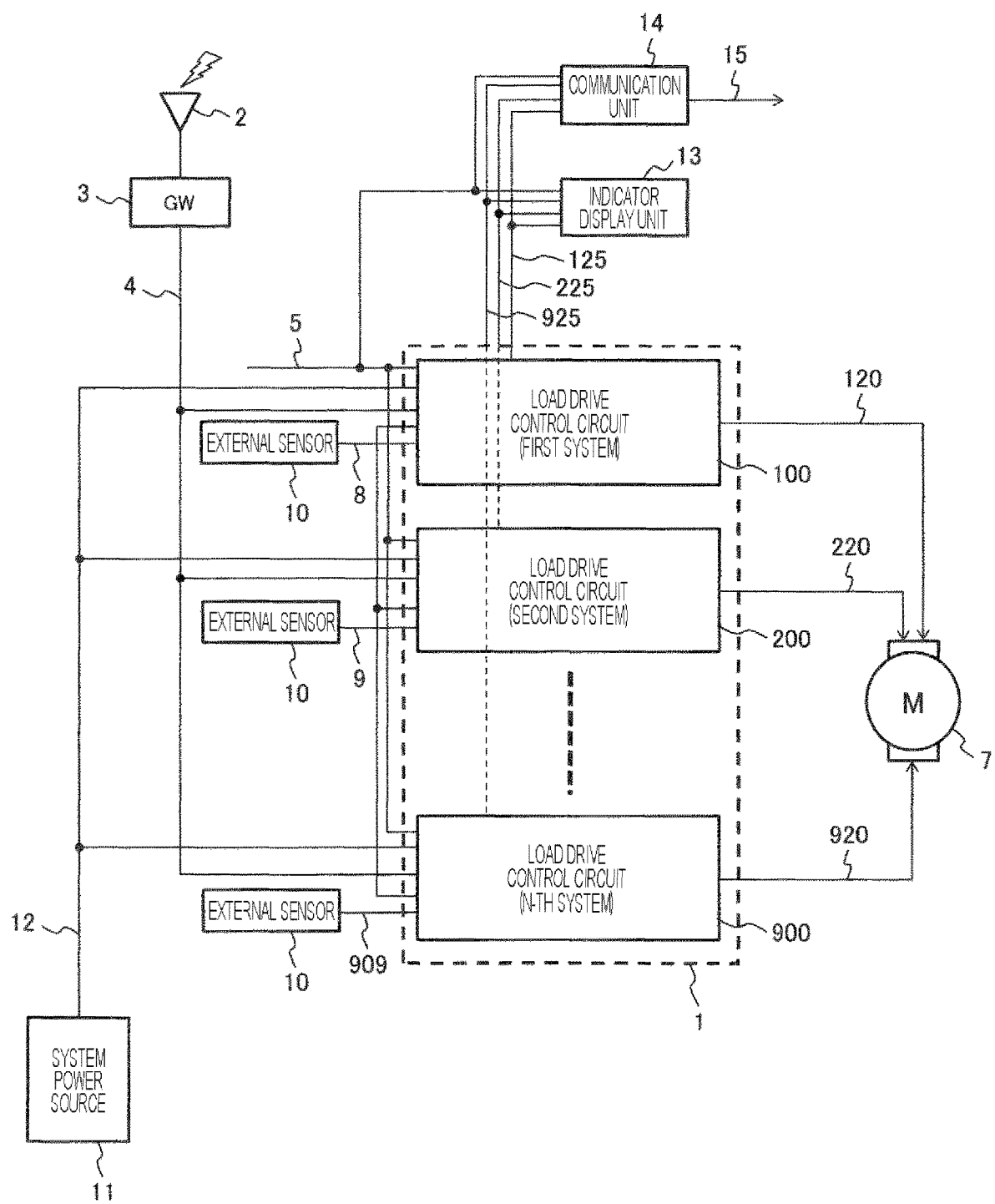
FIG. 22 is a diagram illustrating a schematic configuration of a load drive control device according to a fifth embodiment.

FIG. 22 is a diagram illustrating a schematic configuration of the load drive control device according to the present embodiment. In FIG. 22, reference numeral 900 denotes a load drive control circuit, and indicates a load drive control circuit of a third system or more (N-th system) other than the load drive control circuit (100) of the first system and the load drive control circuit (200) of the second system. The IGN_SW signal 5 is input to each load drive control circuit, and is input to the indicator display unit 13 and the communication unit 14 together with the flag signal (125, 225, 925) for each system. The other configurations are the same as those of the first embodiment.

The present invention has been mainly described with respect to the operation by the two-system redundant system in the first embodiment to the fourth embodiment. However, as illustrated in FIG. 22, the operations and the advantages of the present invention are similar even in the redundant system of three or more systems. For example, in the case of a redundant system of three systems, as described with reference to FIG. 8, when the IGN_SW is turned on before half of the entire program update time, the rollback control is performed, and when the IGN_SW is turned on after half of the entire program update time, the program update control is continuously performed.

In addition, the flag signal (125, 225, 925) and the IGN_SW signal 5 for each system are input to the indicator display unit 13 and the communication unit 14, and even in a case where the motor load 7 is controlled only in a specific system when the IGN_SW is turned on during the program update, it is possible to grasp that the system is operating only in a partial system of the system by notifying the driver or the external ECU of the control using the indicator display unit 13 or the ECU communication signal 15, and it is possible to take appropriate measures such as a safety operation according to the control.

In each of the embodiments described above, each system load drive control circuit that drives the motor load 7 has a symmetrical configuration, but the present invention is not necessarily limited thereto, and an asymmetric redundant configuration may be employed.

Accordingly, there is a possibility that there is a difference in the program update time of each redundant system. However, in a case where the IGN_SW is turned on before a half of the entire time required for the program update, the rollback control is performed, and in a case where the IGN_SW is turned on after the half, the program update control is continuously performed, so that it is possible to always return to the normal state in the shortest time.

In each of the embodiments described above, by using the motor load 7 as a motor for electric power steering of an automobile, it is possible to realize an electric power steering system having high reliability and high responsiveness. Alternatively, by using the motor load 7 as a motor for driving wheels of an automobile, it is possible to realize a highly reliable and highly responsive driving system of an automobile.

Further, the present invention is not limited to the embodiments described above, but includes various modifications.

For example, the above embodiments have been described in detail for easy understanding of the invention, and the invention is not necessarily limited to having all the configurations described. A part of the configuration of a certain embodiment can be replaced with the configuration of another embodiment, and the configuration of another embodiment can be added to the configuration of a certain embodiment. It is possible to add, delete, and replace other configurations for a part of the configuration of each embodiment.

REFERENCE SIGNS LIST 1 load drive control device
2 antenna
3 gateway unit
4 update program signal (update program)
5 IGN_SW signal
6 microcomputer mutual communication signal
7 motor load
8, 9 sensor signal
10 external sensor
11 system power source
12 power source signal
13 indicator display unit
14 communication unit
15 ECU communication signal
100 load drive control circuit (first system)
101 (201) power source unit
102 (202) power source signal
103 (203) microcomputer
104 (204) inter-microcomputer communication unit
105 (205) inter-microcomputer communication signal
106 (206) flag control unit
107 (207) communication unit
109 (209) internal nonvolatile memory
110 (210) boot loader region
111 (211) program flash region
112 (212) data flash region
113 (213) load drive signal
114 (214) pre-driver
115 (215) pre-driver output signal
116 (216) inverter circuit unit
117 (217) inverter signal
118 (218) safety relay
119 (219) safety relay control signal
120, 220 load drive signal
121 (221) external nonvolatile memory
121a region 1
121b region 2
122 (222) update region
123 (223) backup region
124 (224) program update control unit
125 (225) flag signal
126 (226) flag control signal
127 (227) memory control signal
129 (229) control signal output unit
129a (229a) gate circuit
129b (229b) safety relay signal control unit
129c (229c) safety relay signal control signal
129d (229d) load drive signal control unit
129e (229e) load drive signal control signal
129f (229f) inversion buffer
200 load drive control circuit (second system)
225 flag signal
450 program at the time of shipment (of external nonvolatile memory)
451 update program #1
452 update program #2
453 update program #3
900 load drive control circuit (N-th system)

The invention claimed is:

1. A redundant system that controls one load by a plurality of control systems having a redundant configuration, the redundant system comprising:
   a non-transitory computer-readable medium configured to store instructions executable by one or more processors, the instructions, when executed by the one or more processors, cause:
   when an update program signal for the plurality of control systems is received, an update of a control program for each of the plurality of control systems in a predetermined order to be individually executed;
   when a start request of the load is received during the execution of the update of a control program of one predetermined system, the load to be controlled by a system other than the one predetermined system; and
   during control of the load by the system other than the one predetermined system:
      the update of the control program of the one predetermined system to be continued; or
      a rollback of the control program of the one predetermined system to be executed, and
   wherein a control program update state of each system of the plurality of control systems is managed as a flag.

2. The redundant system according to claim 1, wherein the plurality of control systems includes a first system and a second system different from the first system, and the instructions, when executed by the one or more processors, cause an update of a control program of the second system to be executed after an update of a control program of the first system is completed.

3. The redundant system according to claim 1, wherein the instructions, when executed by the one or more processors, cause the load to be controlled by all the systems of the one predetermined system and the system other than the one predetermined system after the update of the control program of the one predetermined system or the rollback is completed.

4. The redundant system according to claim 1, wherein when a start request of the load is received, if a control program update time is less than half of all the control program update times of the plurality of control systems, the instructions, when executed by the one or more processors, cause the rollback of the control program of the one predetermined system to be executed, and if the control program update time is half or more of all the control program update times, the instructions, when executed by the one or more processors, cause the update of the control program of the one predetermined system to be continued.

5. The redundant system according to claim 1, wherein when a start request of the load is received, if the number of update completion systems is less than half of a total number of systems, the instructions, when executed by the one or more processors, cause the rollback of the control program of the one predetermined system to be executed, and if the number of update completion systems is half or more of the total number of systems, the instructions, when executed by the one or more processors, cause the update of the control program of the one predetermined system to be continued.

6. The redundant system according to claim 1, wherein a notification unit notifies an occupant when the load is controlled by a system other than the one predetermined system.

7. The redundant system according to claim 1, wherein a communication unit notifies a host ECU when the load is controlled by a system other than the one predetermined system.

8. The redundant system according to claim 1, wherein each of the plurality of control systems includes a control signal output unit that outputs a control signal based on the flag, and
control of the load is limited by a control signal from the control signal output unit when the flag is in an abnormal state.

9. The redundant system according to claim 1, wherein each of the plurality of control systems includes a control signal output unit that outputs a control signal based on the flag, and
control of the load is limited by a control signal from the control signal output unit according to a control program update state of each system of the plurality of control systems.

10. The redundant system according to claim 3, wherein the non-transitory computer-readable medium stores correction data of each system of the plurality of control systems,
correction data of each system stored in the non-transitory computer-readable medium is read after the update of the control program of the one predetermined system or the rollback is completed, and
the load is controlled in all the systems using the read correction data.

11. The redundant system according to claim 1, wherein each of the plurality of control systems includes a microcomputer that controls writing of a control program and an external nonvolatile memory disposed outside the microcomputer,
the external nonvolatile memory stores an update program and a backup program,
when the update program signal is received, the received update program is overwritten on the program for a previous backup, and
a program for previous update is used for backup.

12. The redundant system according to claim 11, wherein a program stored in an internal nonvolatile memory of the microcomputer is previously written in the external nonvolatile memory in an initial state.

13. The redundant system according to claim 11, wherein an update program stored in the external nonvolatile memory is used when update of the control program of the one predetermined system is performed, and
a backup program stored in the external nonvolatile memory is used when rollback of the control program of the one predetermined system is executed.

14. A load drive control device including a redundant system according to claim 1, wherein
the load is a motor load.

15. The load drive control device according to claim 14, wherein
the motor load is an electric power steering motor.

16. The load drive control device according to claim 14, wherein
the motor load is a motor that drives wheels.

17. The redundant system according to claim 12, wherein an update program stored in the external nonvolatile memory is used when update of the control program of the one predetermined system is performed, and
a backup program stored in the external nonvolatile memory is used when rollback of the control program of the one predetermined system is executed.

* * * * *